(12) United States Patent
Springer et al.

(10) Patent No.: US 10,509,993 B2
(45) Date of Patent: Dec. 17, 2019

(54) METHOD FOR PROVIDING IDENTIFICATION AND ACCESS WITH RESPECT TO A RADIO-FREQUENCY TAG

(71) Applicant: EM Microelectronic-Marin SA, Marin (CH)

(72) Inventors: James J Springer, Colorado Springs, CO (US); Tomas Hrdy, Rudna U Prahy (CZ); Martin Jager, Praha Barrandov (CZ)

(73) Assignee: EM Microelectronic-Marin SA, Marin (CH)

( * ) Notice: Subject to any disclaimer, the term of this patent is extended or adjusted under 35 U.S.C. 154(b) by 44 days.

(21) Appl. No.: 15/813,620

(22) Filed: Nov. 15, 2017

(65) Prior Publication Data

US 2018/0165564 A1    Jun. 14, 2018

(30) Foreign Application Priority Data

Dec. 12, 2016  (EP) .................................... 16203434

(51) Int. Cl.
  *G06K 19/07* (2006.01)
  *G06K 7/00* (2006.01)
  *H04B 5/00* (2006.01)

(52) U.S. Cl.
  CPC ....... *G06K 19/0723* (2013.01); *G06K 7/0008* (2013.01); *H04B 5/0062* (2013.01)

(58) Field of Classification Search
  CPC . G06K 19/0723; G06K 7/0008; H04B 5/0062
  See application file for complete search history.

(56) References Cited

U.S. PATENT DOCUMENTS

| 9,740,894 | B1* | 8/2017 | Kumar | ............... G06K 7/10198 |
| 2007/0236331 | A1* | 10/2007 | Thompson | ........... G06K 7/0008 340/10.1 |
| 2008/0059659 | A1* | 3/2008 | Moritani | ................ G06F 21/62 710/8 |

(Continued)

OTHER PUBLICATIONS

European Search Report dated May 30, 2017 in European application 16203434.2, filed on Dec. 12, 2016.

*Primary Examiner* — James J Yang
*Assistant Examiner* — Kevin Lau
(74) *Attorney, Agent, or Firm* — Oblon, McClelland, Maier & Neustadt, L.L.P.

(57) ABSTRACT

A method for providing identification and access with respect to a passive radio-frequency tag in a tag population, the passive tag being configured for receiving ACK commands including an identification parameter, the method including receiving an initiating command for identifying and accessing a tag, the initiating command including a slot number having a first value if a value in a slot counter of the tag is equal to the first value, then transitioning to an Open or a Secured state, otherwise transitioning to an Arbitrate state in a case where the tag has transitioned to the Arbitrate state, receiving a command for repeating a tag access request, referred to as repetition command, the command including a slot number having a second value, different from the first value, the second value being equal to the value in the slot counter of the tag, transitioning to the Open or Secured state, receiving an ACK command, ignoring the ACK command.

10 Claims, 1 Drawing Sheet

(56) References Cited

U.S. PATENT DOCUMENTS

| | | |
|---|---|---|
| 2008/0122583 A1 | 5/2008 | Bekritsky |
| 2008/0180221 A1 | 7/2008 | Tuttle |
| 2010/0019883 A1 | 1/2010 | Eom et al. |
| 2011/0260838 A1 | 10/2011 | Tuttle |
| 2014/0159869 A1* | 6/2014 | Zumsteg .............. G06K 7/0004 340/10.1 |
| 2017/0228626 A1* | 8/2017 | Nikunen .................. G06K 7/10 |

* cited by examiner

METHOD FOR PROVIDING IDENTIFICATION AND ACCESS WITH RESPECT TO A RADIO-FREQUENCY TAG

This application claims priority from European Patent Application No. 16203434.2 filed on Dec. 12, 2016, the entire disclosure of which is hereby incorporated herein by reference.

FIELD OF INVENTION

The invention relates to the field of radio-frequency identity protocols, defining the physical and logical requirements for communications between passive transponders (tags) and readers. The present invention relates particularly to a method for providing identification and access with respect to a radio-frequency passive tag.

In radio frequency identification, the term tag or transponder refers to a device configured to emit an identifying signal in response to an interrogating received signal. A RFID tag does not necessarily have an internal power supply or battery of its own, in this case the power required to energize the transponder is obtained from an electromagnetic field generated by a reader, also known as interrogator, used to interrogate the tag. Such a tag relies purely on backscatter communication. The term passive refers to tags of this type.

BACKGROUND OF THE INVENTION

A radio-frequency identification (RFID) system comprises readers, also known as interrogators, and tags, also known as labels or transponders. One or more RFID readers may communicate with one or more RFID tags in any numbers of ways. Some such ways are called protocols which call for specific manners of signaling between readers and tags. EPC UHF Gen2 Air Interface Protocol is a widely used protocol, which defines physical and logical requirements for a passive tag, in a case where a reader talks first, throughout the 860 to 960 MHz frequency range. The term "Gen2V2 protocol" will be used to refer to this protocol in the subsequent text.

According to the Gen2V2 protocol, readers manage a tag population within their effective read zone using three basic operations. Each of these operations may comprise multiple commands. The operations are defined as follows:

Select, to choose a tag population. The set of commands dedicated to the Select operation includes the Select command.

Inventory, to identify individual tags within the tag population. The set of commands dedicated to the Inventory operation includes Query, QueryAdjust, QueryRep, ACK and NAK commands.

Access, to communicate with an identified tag. The reader may perform a core operation such as reading, writing, locking, or killing the tag; a security-related operation such as authenticating the tag; or a file-related operation such as opening a particular file in the tag's memory. The set of commands dedicated to the Access operation includes, among others Req_RN and Authenticate commands.

Readers support and tags provide 4 sessions, denoted S0, S1, S2 and S3. Tags participate in one and only one session during an inventory round, and two or more readers can use sessions to independently inventory a common tag population. Each tag comprises four flags denoted 'inventoried flags', each inventoried flag being associated with one of the four sessions. A tag shall maintain an independent inventoried flag for each of its four sessions, and each inventoried flag may have two values, either value A or value B.

Moreover, each tag has a slot counter and a state, which may be implemented all along the Select, Inventory and Access operations. A slot counter contains a value, said value being used to determine the point in an inventory round at which a tag may respond, as it will be explained later. A state characterizes the tag's behavior and response to a reader command. The tag state set includes Ready, Arbitrate, Reply, Acknowledged, Open, Secured and Killed.

Ready is a holding state for energized tags that are neither Killed nor currently participating in an Inventory round: upon entering an energizing radio-frequency (RF) field, a tag that is not killed shall enter the Ready state. A reader may first issue a Select command to select a population of tags in the Ready state. The Select command can set a tag's inventoried flag to either A or B in any one of the four sessions. In this case, the Select command comprises configuration parameters among which a session number and an inventoried flag value. The Select command also comprises selection criteria, which won't be detailed here. Upon receiving a Select command, each tag evaluates the selection criteria, and depending on the evaluation may set the inventoried flag of the session specified in the command to the value specified in the command.

Subsequently, a reader shall issue a Query command. Query initiates an Inventory round and decides which tags participate in the round. A Query command comprises a session number, an inventoried flag value, and an integer in the range (0, 15), denoted slot-count parameter Q. The slot-count parameter sets the number of slots in the inventory round. Upon receiving a Query command, tags with the matching inventoried flag value for the specified session shall draw a Q-bit random value from their random number generator or pseudo-random number generator, and load said value into their slot counter. Subsequently, a tag shall transition to the Arbitrate state and remain silent if the value in its slot counter is nonzero, or transition to the Reply state if the value in its slot counter is zero.

Arbitrate is a holding state for tags that are participating in the current inventory round and whose slot counters hold nonzero values. After issuing a Query command but receiving no response within a time T1 called 'Immediate reply time', the reader typically issues one or more QueryAdjust or QueryRep commands. A QueryAdjust command comprises the session number in the previous Query, but a higher or a smaller slot-count parameter Q. A tag in Arbitrate state shall adjust the value in its slot counter upon receiving a QueryAdjust corresponding to the inventory round currently in progress, then pick a new Q-bit number, and load it into its slot counter. Subsequently, the tag shall transition to the Reply state if said number is zero, or stay in the Arbitrate state if said number is nonzero. A QueryRep command comprises the session number of the previous Query without changing the slot-count parameter. In the Arbitrate state, the tag shall decrement by one the value in its slot counter every time it receives a QueryRep corresponding to the inventory round currently in progress, and it shall transition to the Reply state when the value in its slot counter reaches zero. It should be noted that a tag in the Acknowledged, Open, or Secured state that receives a QueryRep command whose session parameter matches the session parameter in the prior Query, and that is not in the middle of a Kill or an Access command sequence shall invert its inventoried flag (i.e. A→B or B→A, as appropriate) for the current session and transition to Ready.

Upon entering the Reply state, the tag shall backscatter a 16-bit random or pseudo-random number (called RN16). In response, the reader shall acknowledge the tag by echoing the tag's backscattered RN16. This shall be done by sending an ACK command comprising the RN16. Thus, if the tag receives an ACK command containing an identical RN16 (a valid ACK command), it shall transition to the Acknowledged state. Subsequently, the tag shall send an EPC code, stored in a part of its memory called 'EPC memory'. The EPC code identifies the object to which the Tag is or will be attached. It should be noted that another ACK command comprising the RN16 may be sent again to the tag in said Acknowledged state, so as to receive the EPC code again. On the contrary, if the tag fails to receive an ACK command within a time T2 or receives an invalid ACK (that is to say an ACK command including a different RN16), then it shall return to the Arbitrate state.

Access always begins with a reader moving a tag from the Acknowledged state to either the Open or the Secured state by issuing a Req_RN command comprising said tag's RN16. If the tag in the Acknowledged state receives a Req_RN with a correct RN16, it shall generate, store and backscatter a new 16-bit random or pseudo-random number, denoted handle, and transition to the Open or Secured state. Subsequently, if the reader wants to ensure that only this tag is in the Open or Secured state, then it may issue an ACK command with said handle as a parameter. The tag that receives the ACK command with the correct handle shall reply by backscattering said handle and remain in its current state (Open or Secured, as appropriate), whereas those that receive an ACK command with an incorrect handle shall transition from the Open or Secured state to the Arbitrate state.

The choice of transitioning to the Open or to the Secured state when receiving a Req_RN command with a correct handle depends on the tag's access password, said access password being a value stored in a memory of the tag. It should be noted that a tag in the Open state may execute some commands only, whereas a tag in the Secured state with appropriate privileges may execute all commands. A tag in the Open state shall transition to the Secured state after a successful authentication. In order to initiate said authentication, a reader may issue an Authenticate command, said command comprising the tag's handle.

A reader and a tag can communicate indefinitely in the Open or Secured state, but the reader may end the communication at any time in order to identify and access other tags by issuing a QueryRep command. In this case, the tag shall transition from the Open or Secured state to the Ready state. The whole process ends when the reader has issued Q−1 QueryRep commands subsequent to a Query command, where Q is the slot-count parameter comprised in said Query command.

Figure 1:
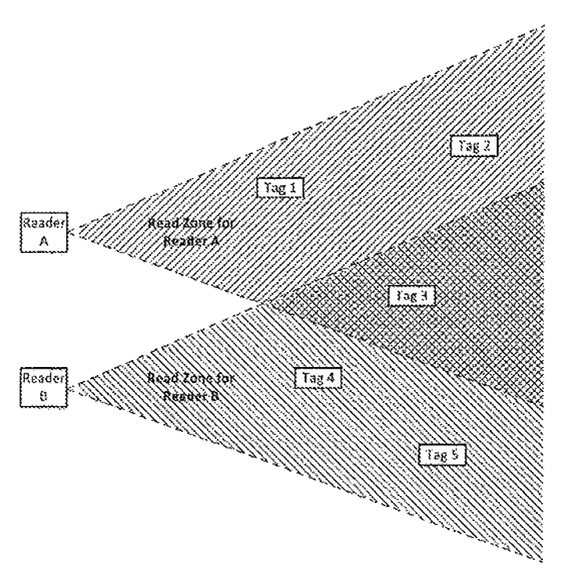
FIG. 1, already mentioned, is a schematic representation of a RFID system comprising two readers, Reader A and Reader B, and a Tag population comprising five Tags 1, 2, 3, 4, 5, wherein Tag 3 is in the effective read zone for both Readers A and Reader B Table 1A, already mentioned, illustrates an inventory and access sequence between Reader A and Tags 1, 2 and 3

FIG. 1 shows a RFID system comprising two readers, Reader A and Reader B, and a Tag population comprising five Tags 1, 2, 3, 4, 5. Tags 1, 2 and 3 are in the effective read zone for Reader A, and Tags 3, 4 and 5 are in the effective read zone for Reader B. This means Tags 1, 2 and 3 can receive operating energy and commands, and backscatter responses from a RF field generated by Reader A, and Tags 3, 4 and 5 can receive operating energy and commands, and backscatter responses from a RF field generated by Reader B.

By way of example only, Table 1A illustrates an inventory and access sequence between Reader A and Tags 1, 2 and 3 according to the Gen2V2 protocol. First column relates to Reader A, and shows in particular commands that Reader A issues, and responses that Reader A receives during the communication sequence. Last column relates to the Tags, and in particular shows actions performed by a Tag in response to a command received from Reader A. The middle column shows messages directions: an arrow pointing right indicates a command from Reader A to at least a Tag; an arrow pointing left indicates a response from at least a tag to Reader A. The second column shows the communication slot, which starts from zero and is incremented by one every time Reader A issues a QueryRep command subsequently to a Query command. When the communication slot reaches Q−1, where Q is the slot-count parameter included in the Query command, the sequence ends. The fourth column shows timing requirements to be applied to a command or a reply.

Table 1B—resp. 1C, 1D—relates to Tag 1—resp. Tag 2, 3. For each table, first column shows the state of the Tag, second column shows the value in the slot counter of the Tag, third column shows the RN16 or the handle (in hexadecimal) generated by the random number generator or pseudo-random number generator of the Tag, fourth column shows the session used by the Tag to communicate with Reader A, and last column shows the inventoried flag value associated with said session.

In a step 1, Reader A generates an RF field. As a result, Tags 1, 2 and 3, which are in the read zone for Reader A, enter the Ready state. At this stage, for each of these Tags, the slot counter does not contain any value, no RN16 or handle has been generated yet, the session to be used with Reader A has not been defined yet, and the inventoried flag value is not applicable since the session is undefined.

In a step 2, Reader A issues a Select command, said command comprising a session number Sx and an inventoried flag value IFVx. In the described example, the session number Sx is S2 and the inventoried flag value IFVx is A. As a result, Tags 1, 2 and 3 set their inventoried flag value for session S2 to A.

In a step 3, Reader A issues a Query command, said command comprising a session number Sx, an inventoried flag value IFVx, and a slot-count parameter Q in the range (0, 15). In the described example, the session number Sx is S2, the inventoried flag value IFVx is A, and the slot-count parameter Q is 8. As a result, Tag 1, 2 and 3 enter the Arbitrate state, and generate a Q-bit number and a 16-bit number (RN16) using their random number generator or pseudo-random number generator. In the described example, the Q-bit number and the RN16 generated by Tag 1 are 1 and 1111; the Q-bit number and the RN16 generated by Tag 2 are 2 and 2222; and the Q-bit number and the RN16 generated by Tag 3 are 3 and 3333. The communication slot is set to zero.

In a step 4, Reader A waits for time T1 and does not receive any reply, since none of Tags 1, 2 or 3 has zero as a value in their slot counter.

In a step 5, Reader A issues a QueryRep command, said command comprising the session number of the previous Query command, that is to say S2. As a result, Tags 1, 2 and 3, whose slot counters hold nonzero values, decrement their slot counter. Moreover, since the value in Tag 1's slot counter turns zero, Tag 1 transitions to the Reply state. The communication slot is increased to one.

In a step 6, Tag 1 backscatters its RN16, said RN16 being received by Reader A.

In a step 7, Reader A acknowledges Tag 1 by echoing its RN16 within an ACK command. As a result, Tag 1 transitions to the Acknowledged state.

In a step 8, Tag 1 sends its EPC code, said EPC code being received by Reader A.

In a step 9, Reader A sends a Req_RN command comprising Tag 1's RN16, which makes Tag 1 transition to the Open or Secured state, depending on Tag 1's access password.

In a step 10, Tag 1 generates, stores and backscatters a new 16-bit random or pseudo-random number, the handle, said handle being received by Reader A. In the described example, the handle generated by Tag 1 is 6666.

In a step 11, Reader A sends an Authenticate command comprising Tag 1's handle. As a result, Tag 1 transitions to the Open state.

In a step 12, Tag 1 backscatters a crypto response, said crypto response being received by Reader A.

In a step 13, Reader A issues a QueryRep command so as to identify other Tags. Said command comprises the session number of the previous Query command, that is to say S2. As a result, Tag 1 inverts its inventoried flag (A→B) and transitions to the Ready state. Besides that, all Tags with inventoried flag value A for session S2 and whose slot counter holds a nonzero value, that is to say Tags 2 and 3, decrement their slot counter. Since the value in Tag 2's slot counter turns zero, Tag 2 transitions to the Reply state. The communication slot is increased to two.

In a step 14, Tag 2 backscatters its RN16, said RN16 being received by Reader A.

In a step 15, Reader A acknowledges Tag 2 by echoing its RN16 within an ACK command. As a result, Tag 2 transitions to the Acknowledged state.

In a step 16, Tag 2 sends its EPC code, said EPC code being received by Reader A.

In a step 17, Reader A sends a Req_RN command comprising Tag 2's RN16, which makes Tag 2 transition to the Open or Secured state, depending on Tag 2's access password.

In a step 18, Tag 2 generates, stores and backscatters a new 16-bit random or pseudo-random number, the handle, said handle being received by Reader A. In the described example, the handle generated by Tag 2 is 7777.

In a step 19, Reader A sends an Authenticate command comprising Tag 2's handle. As a result, Tag 2 transitions to the Open state.

In a step 20, Tag 2 backscatters a crypto response, said crypto response being received by Reader A.

In a step 21, Reader A issues a QueryRep command so as to identify other Tags. Said command comprises the session number of the previous Query command, that is to say S2. As a result, Tag 2 inverts its inventoried flag (A→B) and transitions to the Ready state. Besides that, all Tags with inventoried flag value A for session S2 and whose slot counter holds a nonzero value, that is to say Tag 3 only, decrement their slot counter. Since the value in Tag 3's slot counter turns zero, Tag 3 transitions to the Reply state. The communication slot is increased to three.

In a step 22, Tag 3 backscatters its RN16, said RN16 being received by Reader A.

In a step 23, Reader A acknowledges Tag 3 by echoing its RN16 within an ACK command. As a result, Tag 3 transitions to the Acknowledged state.

In a step 24, Tag 3 sends its EPC code, said EPC code being received by Reader A.

In a step 25, Reader A sends a Req_RN command comprising Tag 3's RN16, which makes Tag 3 transition to the Open or Secured state, depending on Tag 3's access password.

In a step 26, Tag 3 generates, stores and backscatters a new 16-bit random or pseudo-random number, the handle, said handle being received by Reader A. In the described example, the handle generated by Tag 3 is 8888.

In a step 27, Reader A sends an Authenticate command comprising Tag 3's handle. As a result, Tag 3 transitions to the Open state.

In a step 28, Tag 3 backscatters a crypto response, said crypto response being received by Reader A.

In a step 29, Reader A issues a QueryRep command so as to identify other Tags. Said command comprises the session number of the previous Query command, that is to say S2. As a result, Tag 3 inverts its inventoried flag (A→B) and transitions to the Ready state. Nothing else happens since there are no more tags in Reader A's read zone that have A as an inventoried flag value for session S2. The communication slot is increased to four.

In a step 30, Reader A waits for time T1 and does not receive any reply to the previous QueryRep command.

In a step 31, Reader A issues another QueryRep comprising the session number of the previous Query command, that is to say S2. Nothing happens since there are no more tags in Reader A's read zone that have A as an inventoried flag value for session S2. The communication slot is increased to five.

In a step 32, Reader A waits for time T1 and does not receive any reply to the previous QueryRep command.

In a step 33, Reader A issues another QueryRep comprising the session number of the previous Query command, that is to say S2. Nothing happens since there are no more tags in Reader A's read zone that have A as an inventoried flag value for session S2. The communication slot is increased to six.

In a step 34, Reader A waits for time T1 and does not receive any reply to the previous QueryRep command.

In a step 35, Reader A issues another QueryRep comprising the session number of the previous Query command, that is to say S2. Nothing happens since there are no more tags in Reader A's read zone that have A as an inventoried flag value for session S2. The communication slot is increased to seven.

In a step 36, Reader A waits for time T1 and does not receive any reply to the previous QueryRep command. Since the slot-count parameter is 8 and the communication slot has reached 7, the inventory round is ended after this last unsuccessful attempt to identify other Tags.

As already explained, all ACK commands issued by a reader and intended for a tag shall include a 16-bit random number previously generated and backscattered by the tag, said number being either the RN16 or the handle. If a reader issues an ACK command to a tag in the Reply or Acknowledged state, then the echoed number shall be the RN16 that the tag previously backscattered as it transitioned from the Arbitrate state to the Reply state. If the reader issues an ACK command to a tag in the Open or Secured state, then the echoed number shall be the tag's handle. For reasons of convenience, the echoed 16-bit random number (either the RN16 or the handle) included in an ACK command is referred to as 'session handle'. As a consequence, 'session handle' may refer indifferently to a tag's RN16 or handle. Upon receiving an ACK command, a tag shall verify that the session handle is correct prior to executing said command.

Receiving an ACK command with an incorrect session handle may happen in a RFID system having multiple RFID readers operating in parallel, because some tags might be simultaneously within the effective read zone for more than one reader, whether this is intentional or not. For instance, in the example illustrated in FIG. 1, Tag 3 is in the effective read zone for both Readers A and B. Thus, Tag 3 may hear an ACK command issued by Reader B while being in communication with Reader A. Said ACK command may for instance be intended for Tag 4. The probability of two readers simultaneously communicating with two tags which have the same session handle being 1 in $2^{16}$, the session handle included in said ACK command is likely to be different from Tag 3's session handle.

A tag hearing an ACK command with an incorrect session handle shall not execute said command. Furthermore, as already mentioned, if said tag state is Open or Secured, then the tag shall transition to the Arbitrate state. This is problematic because a transition to the Arbitrate state essentially terminates communication between the tag and the reader with which the tag was communicating. In the previous-mentioned example, if Tag 3 is in the Open or the Secured state and hears Reader B sending an ACK command intended to Tag 4, said ACK command comprising Tag 4's session handle, then Tag 3 shall transition to the Arbitrate state, thereby losing connection with Reader A.

If a tag terminates communication with a reader, there is usually the possibility to identify and access said tag at a later time. However, this is not always the case when the tag is moving rapidly through read zones.

SUMMARY OF THE INVENTION

It is an object of the invention to provide an inventory and access method, compatible with the Gen2V2 protocol, wherein cases of communication loss due to receiving an ACK command with an incorrect session handle are avoided.

Thus, the invention concerns a method for providing identification and access with respect to a passive radio-frequency tag in a tag population, the passive tag being configured for receiving commands, among which commands for acknowledging a tag, referred to as ACK, an ACK command comprising an identification parameter in the form of a 16-bit number, the tag having:
  a slot counter holding a value determining the point in an inventory round at which the tag may respond
  a state that characterizes the tag's behavior and response to reader's commands, said state being part of a state list comprising:
    Ready, which is a holding state for a tag not currently participating in an inventory round
    Arbitrate, which is a holding state for a tag currently participating in an inventory round and whose slot counter holds a nonzero value, and
    Open or Secured, which are states a tag transitions to when a reader starts accessing it.

According to the invention, the method comprises the following steps, performed by the tag initially in the Ready state:
  receiving a command for identifying and accessing a tag, referred to as initiating command, said initiating command comprising a slot number having a first value
  if the value in the slot counter of the tag is equal to the first value, then transitioning to the Open or Secured state, otherwise transitioning to the Arbitrate state
  in a case where the tag has transitioned to the Arbitrate state:
    receiving a command for repeating a tag access request, referred to as repetition command, said command comprising a slot number having a second value, different from the first value, said second value being equal to the value in the slot counter of the tag transitioning to the Open or Secured state
    receiving an ACK command
    ignoring said ACK command.

The invention offers two new commands, called initiating command and repetition command, which may be integrated within the Gen2v2 protocol. Preferentially, the initiating command provides similar functionality to the command sequence Select/Query/ACK/Req_RN as defined in the Gen2V2 protocol, and the repetition command provides similar functionality to the command sequence QueryRep/ACK/Req_RN or QueryAdjust/ACK/Req_RN. The initiating command enables the reader to start an inventory round, instruct the tag to participate in said inventory round, and request access to said tag if said tag's parameters meet a selection criterion included in said initiating command. The selection criterion is a slot number: if the value in the slot counter of the tag is equal to the slot number comprised in the initiating command, then the tag shall transition to the Open or Secured state, thereby starting being accessed. Otherwise, the tag access will start (that is to say, the tag will transition to the Open or Secured state) upon receipt of a repetition command that comprises a slot number equal to the value in the tag's slot counter. For instance, the slot number in the initiation command may be zero, and the slot number may be increased by one each time the reader sends a new repetition command. In this way, at some point the tag will receive a repetition command that comprises a slot number equal to the value in its slot counter.

According to the Gen2V2 protocol, a tag in the Open or Secured state shall transition to the Arbitrate state upon receiving an ACK command whose identification parameter is different from the tag's handle. According to the invention, a tag that has received an initiating command earlier in the identification and access sequence and is now in the Open or Secured state, shall, upon receiving an ACK command, ignore said command. In other words, from the point the tag transitions to the Open or Secured state and as long as the tag is in the Open or Secured state, all ACK commands received by the tag shall be ignored.

Furthermore, the method according to the invention may comprise one or a combination of the following characteristics.

In an embodiment, the method comprises the following steps, performed after the step of transitioning to the Open or Secured state:
  receiving a command for transitioning a tag into the Arbitrate state, referred to as NAK
  ignoring said NAK command.

This allows solving another inconvenience of the Gen2V2 protocol. According to the Gen2V2 protocol, if a tag is in the Open or Secured state and hears a NAK command, then this tag is unconditionally required to transition to the Arbitrate state. This is problematic if the NAK command was not intended for the tag, in a situation where said tag is in the read-zone of at least two readers. According to the invention, a tag that has received an initiating command earlier in the identification and access sequence and is now in the Open or Secured state, shall, upon receiving a NAK command, ignore said command. In other words, from the point the tag transitions to the Open or Secured state and as long as the tag is in the Open or Secured state, all NAK commands received by the tag shall be ignored. As a consequence, cases of communication loss due to receiving a NAK command intended for another tag are avoided.

In an embodiment, the tag has an inventoried flag for each session a reader may use to identify the tag within an inventory round, said inventoried flag having a value indicating whether the tag may respond to the reader, the first initiating command includes a session number and an inventoried flag value as parameters, and the method comprises the following step, performed after the step of receiving the initiating command: setting the inventoried flag for the session specified in the initiating command to the value specified in the initiating command.

In an embodiment, the tag has a random number generator or pseudo-random number generator arranged to generate a 16-bit value when the tag starts participating in an inventory round, the initiating command comprises, as a parameter, a reader identifier in the form of a N-bit number, N being an integer in the range (1, 15), and the method comprises the following steps, performed between the step of receiving the initiating command and the step of transitioning to the Open or Secured state:

generating, by means of the random number generator or pseudo-random number generator, a 16-bit value referred to as binding handle, said binding handle comprising N juxtaposed bits forming the reader identifier backscattering the binding handle, said binding handle being received by the reader.

Upon receiving the initiating command, the tag shall generate a binding handle, as it would have generated a RN16 if it had been in response to a Query, QueryAjust or QueryRep command, or a handle if it had been in response to a Req_RN command. However, the binding handle differs from a classic RN16 or a classic handle in that it is not completely a random number: a portion of the first binding handle is made of the reader identifier included in the first initiating command. The identifier for the reader may be a unique value that is different from the values for all other readers, or at least for readers that have some portion of their reading zone in common. Then, the tag shall backscatter the binding handle, as it would have done with a classic RN16 or a classic handle. Subsequently, the binding handle is received by the reader, which may use it to identify and acknowledge the tag.

In an embodiment, the tag has a random number generator or pseudo-random number generator arranged to generate a Q-bit value when the tag starts participating in an inventory round, Q being an integer in the range (0, 15), the initiating command comprises Q as a parameter, said parameter being referred to as slot-count parameter, the initiating command further comprises a first slot number as a parameter, and the method comprises the following step, performed between the step of receiving the initiating command and the step of evaluating whether the value in the slot counter of the tag is equal to the first slot number: generating, by means of the random number generator or pseudo-random number generator, a Q-bit value and loading it into the slot counter.

In an embodiment, the binding handle comprises Q juxtaposed bits different from the N juxtaposed bits, said Q juxtaposed bits forming the Q-bit value.

It should be noted that including the Q-bit value in the binding handle provides additional confidence to the reader that a tag response is for the correct reader.

In an embodiment, Q is in the range 0 to 5.

In an embodiment, the 16-N-Q bits left in the binding handle are generated randomly by the random number generator or pseudo-random number generator.

In an embodiment, the method comprises the following steps, performed between the step of transitioning to the Arbitrate state and the step of receiving a repetition command and the step of receiving a repetition command comprising a second slot number:

receiving an intermediate repetition command comprising a slot number having an intermediate value between the first value and the second value ignoring said intermediate repetition command.

In an embodiment, the tag has a memory comprising an Electronic Product Code, and the method comprises the following step, performed after the step of transitioning to the Open or Secured state: sending the Electronic Product Code.

BRIEF DESCRIPTION OF THE DRAWINGS

The present invention will be described subsequently with reference to the attached drawings, given by way of example, but in no way limited thereto, in which.

Table 1B, 1C and 1D, already mentioned, illustrate some features of Tags 1, 2 and 3 along the communication sequence of Table 1A Table 2A illustrates an inventory and access sequence between Reader A and Tags 1, 2 and 3, according to an embodiment of the present invention Table 2B, 2C and 2D illustrate some features of Tags 1, 2 and 3 along the communication sequence of Table 2A.

DETAILED DESCRIPTION OF THE INVENTION

The method according to the invention is supposed to be carried out by a radio-frequency passive tag. Said tag comprises means to carry out the Gen2V2 protocol, so it has, as it has been explained before in more details:

a memory in which an EPC code and an access password are stored four inventoried flags, one for each session S1, S2, S3, S4 the reader may use to identify the tag within an inventory round. Each inventoried flag has either value A or value B, said value indicating whether the tag may respond to the reader.

a slot counter holding a value determining the point, in an inventory round initiated by the reader, at which the tag may respond a random number generator or pseudo-random number generator, arranged to generate:

a 16-bit value referred to as RN16, when it starts participating in an inventory round, that is to say in response to a Query, QueryRep or QueryAdjust command with appropriate parameters a Q-bit value, Q being an integer in the range (0, 15), when it starts participating in an inventory round, that is to say in response to a Query, QueryRep or QueryAdjust with appropriate parameters a 16-bit value referred to as handle, when it starts participating in an access operation, that is to say in response to a Req_RN command having the RN16 as a parameter.

As defined in the Gen2V2 protocol, the tag's behavior and response to a reader's command is defined by its state, which are, among others:

Ready, which is a holding state for a tag not currently participating in an inventory round Arbitrate, which is holding state for a tag participating in an inventory round and whose slot counter holds a nonzero value Reply, which is a state a tag in the Arbitrate state transitions to when the value in its slot counter reaches zero Acknowledged, which is a state a tag in the Reply state transitions to when it receives an ACK command whose identification parameter is identical to its RN16

Open or Secured, which are states a tag in the Acknowledged state transitions to when it receives an Req_RN command whose parameter is identical to its RN16.

According to the invention, two additional commands are added to the set of commands defined in the Gen2V2 protocol.

A first command, referred to as initiating command, provides similar functionality to the command sequence Select/Query/ACK/Req_RN. The initiating command has the following parameters:

a session number Sx (S1, S2, S3 or S4)
an inventoried flag value IFVx (A or B)
a slot-count parameter Q, Q being an integer in the range (0, 15)
an identifier RD of the reader that issues the first initiating command, in the form of a N-bit value, N being an integer in the range (1, 15)
a slot number S, which is a positive or zero integer.

A second command, referred to as repetition command, provides similar functionality to the command sequence QueryRep/ACK/Req_RN or QueryAdjust/ACK/Req_RN. The initiating command has a slot number as a parameter, whose value is different from the one in the initiation command.

Upon receipt of an initiating command while in the Ready state, the tag shall:

set its inventoried flag for the session Sx instructed in the first initiating command, to the value IFVx specified in the first initiating command generate, by means of the random number generator or pseudo-random number generator, a Q-bit value and loading it into the slot counter generate, by means of the random number generator or pseudo-random number generator, a 16-bit value referred to as binding handle, said binding handle comprising N juxtaposed bits forming the reader identifier RD specified in the first initiating command, Q juxtaposed bits forming the Q-bit value, and 16-N-Q random bits. Preferably, N=5 and Q is in the range 0 to 5. In the illustrated embodiment, the binding handle has the following structure: the 4 most significant bits represent the reader identifier, the 4 least significant bits represent the Q-bit value, and the 8 middle bits are a random value. In another embodiment, the first binding handle comprises N juxtaposed bits, preferably 4 or 5, forming the reader identifier RD specified in the first initiating command, and 16-N random bits. In this other embodiment, the binding handle has preferably the following structure: the 4 or 5 most significant bits represent the reader identifier, and the 12 or 11 least important bits are a random value transition to the Arbitrate state if the Q-bit value is different from the slot number included in the initiation command, to the Open/Secured state otherwise, the choice of ending state (Open or Secured) depending on the Tag's access password (in the access password is zero, then the tag shall transition to the Secured state; if the access password is nonzero, then the tag shall transition to the Open state).

In a case where the tag has transitioned to the Arbitrate state, it shall wait for a repetition command. Upon receipt of a repetition command while in the Arbitrate state, the tag shall remain in the Arbitrate state if its Q-bit value (the value in its slot counter) is different from the slot number included in the repetition command. Otherwise, the tag shall transition to the Open/Secured state, the choice of ending state (Open or Secured) depending on the Tag's access password (in the access password is zero, then the tag shall transition to the Secured state; if the access password is nonzero, then the tag shall transition to the Open state).

When the tag transitions to the Open or Secured state, either from the Ready or from the Arbitrate state, it shall:
backscatter the EPC code.
backscatter the binding handle Moreover, when a tag in the Open state receives a repetition command, it shall invert its inventoried flag (A→B or B→A) and transition to the Ready state.

By way of example only, Table 2A illustrates an inventory and access sequence between Reader A and Tags 1, 2 and 3, implementing the initiating command and several repetition commands. First column relates to Reader A, and shows in particular commands Reader A issues, and responses Reader A receives during the sequence. Last column relates to the Tags, and in particular shows actions performed by a Tag in response to a command from Reader A. The middle column shows messages directions: an arrow pointing right indicates a command from Reader A to at least a Tag; an arrow pointing left indicates a response from at least a tag to Reader A. The second column shows the communication slot, which starts from zero and is incremented by one every time Reader A issues a repetition command subsequently to an initiating command. When the communication slot reaches Q−1, the sequence ends. The fourth column shows timing requirements to be applied to a command or a reply.

Table 2B—resp. 2C, 2D—relates to Tag 1—resp. Tag 2, 3. For each table, first column shows the state of the Tag, second column shows the value in the slot counter of the Tag, third column shows the binding handle (in hexadecimal) generated by the random number generator or pseudo-random number generator of the Tag at some points of the sequence, fourth column shows the session used by the Tag to communicate with Reader A, and last column shows the inventoried flag value associated with said session.

In a step 1, Reader A generates an RF field. As a result, Tags 1, 2 and 3, which are in the read zone for Reader A, enter the Ready state. At this stage, for each of these Tags, the slot counter does not contain any value, no first or second binding handle has been generated yet, the session to be used with Reader A has not been defined yet, and the inventoried flag value is not applicable since the session is undefined.

In a step 2, Reader A issues an initiation command having as parameters:
the session number S2
the inventoried flag value A
8 as a slot-count parameter Q
a reader identifier C (in hexadecimal, that is to say 1100 in the binary system)
a zero slot number S.

As a result, Tags 1, 2 and 3 set their inventoried flag value for session S2 to A. In addition, Tags 1, 2 and 3 generate a 8-bit number and a 16-bit number (binding handle) using their random number generator or pseudo-random number generator. In the described embodiment, the binding handles have the following structure: the 4 most significant bits represent the reader identifier, the 4 least significant bits represent the Q-bit value, and the 8 middle bits are a random value. In the illustrated example, the 8-bit number and the first binding handle generated by Tag 1 are 1 and C661; the 8-bit number and the first binding handle generated by Tag 2 are 2 and C772; and the 8-bit number and the first binding handle generated by Tag 3 are 3 and C883. Moreover, Tag 1, 2 and 3 enter the Arbitrate state. Besides that, the communication slot is set to zero.

In a step 3, Reader A waits for time T1 and does not receive any reply, since none of Tags 1, 2 or 3 has zero as a value in their slot counter.

In a step 4, Reader A issues a repetition command, said command comprising a slot number different from the slot number of the initiating command, 1 in this preferred embodiment. As a result, all Tags in the Arbitrate state, with inventoried flag value A for session S2 and whose slot counter holds value 1, that is to say Tag 1, transition to the Open/Secured state. The communication slot is increased to one.

In a step 5, Tag 1 backscatters its binding handle and its EPC, said binding handle and EPC code being received by Reader A. Thus, Tag 1 is identified.

In a step 6, Reader A sends an Authenticate command comprising Tag 1's binding handle. As a result, Tag 1 transitions to the Open state.

In a step 7, Tag 1 backscatters a Crypto response, said Crypto response being received by Reader A.

In a step 8, Reader A issues a repetition command so as to identify other Tags. Said command comprises a slot number different from the slot number of the initiating command and of the prior repetition command, 2 in this preferred embodiment. As a result, all Tags in the Arbitrate state, with inventoried flag value A for session S2 and whose slot counter holds value 2, that is to say Tag 2, transition to the Open/Secured state. Besides, Tag 1 inverts its inventoried flag (A→B) and transitions to the Ready state. The communication slot is increased to two.

In a step 9, Tag 2 backscatters its binding handle and its EPC, said binding handle and EPC code being received by Reader A. Thus, Tag 2 is identified.

In a step 10, Reader A sends an Authenticate command comprising Tag 2's binding handle. As a result, Tag 2 transitions to the Open state.

In a step 11, Tag 2 backscatters a Crypto response, said Crypto response being received by Reader A.

In a step 12, Reader A issues a repetition command so as to identify other Tags. Said command comprises a slot number different from the slot number of the initiating command and of the prior repetition commands, 3 in this preferred embodiment. As a result, all Tags in the Arbitrate state, with inventoried flag value A for session S2 and whose slot counter holds value 3, that is to say Tag 3, transition to the Open/Secured state. Besides, Tag 2 inverts its inventoried flag (A→B) and transitions to the Ready state. The communication slot is increased to three.

In a step 13, Tag 3 backscatters its binding handle and its EPC, said binding handle and EPC code being received by Reader A. Thus, Tag 3 is identified.

In a step 14, Reader A sends an Authenticate command comprising Tag 3's binding handle. As a result, Tag 3 transitions to the Open state.

In a step 15, Tag 3 backscatters a Crypto response, said Crypto response being received by Reader A.

In a step 16, Reader A issues a repetition command so as to identify other Tags. Said command comprises a slot number different from the slot number of the initiating command and of the prior repetition commands, 4 in this preferred embodiment. Besides, Tag 3 inverts its inventoried flag (A→B) and transitions to the Ready state. The communication slot is increased to four. Nothing else happens since there are no more tags in Reader A's read zone that has A as an inventoried flag value for session S2 and value 4 in its slot counter.

In a step 17, Reader A waits for time T1 and does not receive any reply to the previous repetition command.

In a step 18, Reader A issues a repetition command so as to identify other Tags. Said command comprises a slot number different from the slot number of the initiating command and of the prior repetition commands, 5 in this preferred embodiment. The communication slot is increased to five. Nothing else happens since there are no more tags in Reader A's read zone that has A as an inventoried flag value for session S2 and value 5 in its slot counter.

In a step 19, Reader A waits for time T1 and does not receive any reply to the previous repetition command.

In a step 20, Reader A issues a repetition command so as to identify other Tags. Said command comprises a slot number different from the slot number of the initiating command and of the prior repetition commands, 6 in this preferred embodiment. The communication slot is increased to six. Nothing else happens since there are no more tags in Reader A's read zone that has A as an inventoried flag value for session S2 and value 6 in its slot counter.

In a step 21, Reader A waits for time T1 and does not receive any reply to the previous repetition command.

In a step 22, Reader A issues a repetition command so as to identify other Tags. Said command comprises a slot number different from the slot number of the initiating command and of the prior repetition commands, 7 in this preferred embodiment. The communication slot is increased to five. Nothing else happens since there are no more tags in Reader A's read zone that has A as an inventoried flag value for session S2 and value 7 in its slot counter.

In a step 23, Reader A waits for time T1 and does not receive any reply to the previous repetition command. Since the slot-count parameter is 8 and the communication slot has reached 7, the inventory round is ended after this last unsuccessful attempt to identify other Tags.

In this example, the slot number in the initiation command is zero and is increased by one at each iteration of a repetition command. Of course, other embodiments are possible, for instance start with a high value and decrease it by one at each iteration of a repetition command.

As already mentioned, Tag 3 is in the read zone for both Reader A and Reader B, which implies that Tag 3 may receive, at any time of an identification and access sequence according to the invention, an ACK command issued by Reader B and intended for another tag, let us say Tag 4. Thus, according to the invention, Tag 3 shall ignore said ACK command, which was the objective of the present invention, since such a command is not supposed to be received from Reader A.

It should be noted that Tag 3 may receive other kinds of commands from Reader B:
  if Tag 3 receives an initiation command from Reader B, Tag 3 shall switch from Reader A to Reader B and may be subsequently inventoried and accessed by Reader B
  if Tag 3 receives an Authenticate command from Reader B, then if Tag 3's state is Ready or Arbitrate, or if the 16-bit value comprised in said command does not match the expected binding handle value, then Tag 3 shall ignore said command. Otherwise, if the 16-bit value matches the expected value (which is highly unlikely, though), then Tag 3 shall respond to the Authenticate command and may no longer be in sync with Reader A if Tag 3 receives a repetition command from Reader B, then if Tag 3's state is not Arbitrate or if the 16-bit value comprised in said command does not match the expected binding handle value, then Tag 3 shall ignore said command. Otherwise, if Tag 3's state is Arbitrate and the 16-bit value matches the expected value (which is highly unlikely, though), then Tag 3 shall switch from Reader A to Reader B and may be subsequently inventoried and accessed by Reader B if Tag 3 receives a Select command from Reader B, Tag 3 shall switch from Reader A to Reader B and may be subsequently inventoried and accessed by Reader B if Tag 3 receives a Query command from Reader B, Tag 3 shall switch from Reader A to Reader B and may be subsequently inventoried and accessed by Reader B if Tag 3 receives a QueryRep or a QueryAdjust command from Reader B, Tag 3 shall ignore said command if Tag 3 receives a Req_RN command from Reader B, Tag 3 shall ignore said command if Tag 3 receives a NAK command from Reader B, Tag 3 shall ignore said command.

Although the exemplary embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within spirit and scope of the invention. Accordingly, the foregoing disclosure, description, and figures are for illustrative purposes only and do not in any way limit the invention, which is defined by the claims.

What is claimed is:

1. A method for providing identification and access with respect to a passive radio-frequency tag in a tag population, the passive tag being configured for receiving commands, among which commands for acknowledging a tag, referred to as ACK, an ACK command comprising an identification parameter in the form of a 16-bit number, the tag including:
 a slot counter holding a value determining the point in an inventory round at which the tag may respond to a reader, and
 a state that characterizes the tag's behavior and response to the reader's commands, said state being part of a state list including:
  Ready, which is a holding state for a tag not currently participating in an inventory round,
  Arbitrate, which is a holding state for a tag currently participating in an inventory round and whose slot counter holds a nonzero value, and
  Open or Secured, which are states a tag transitions to when a reader starts accessing it,
 said method comprising the following steps, performed by the tag initially in the Ready state:
 receiving a command for identifying and accessing a tag, referred to as initiating command, said initiating command comprising a slot number having a first value;
 if the value in the slot counter of the tag is equal to the first value, then transitioning to the Open or Secured state, otherwise transitioning to the Arbitrate state; and
 in a case where the tag has transitioned to the Arbitrate state:
  receiving a command for repeating a tag access request, referred to as repetition command, said command comprising a slot number having a second value, different from the first value, said second value being equal to the value in the slot counter of the tag,
  transitioning to the Open or Secured state in response to the second value being equal to the value in the slot counter of the tag,
  receiving an ACK command, and
  ignoring said ACK command in response to the tag being in the Open or Secured state.

2. The method according to claim 1, comprising the following steps, performed after the step of transitioning to the Open or Secured state:
 receiving a command for transitioning a tag into the Arbitrate state, referred to as NAK; and
 ignoring said NAK command.

3. The method according to claim 1, wherein the tag has an inventoried flag for each session a reader may use to identify the tag within an inventory round, said inventoried flag having a value indicating whether the tag may respond to the reader, the first initiating command including a session number and an inventoried flag value as parameters, and
 the method further comprises the following step, performed after the step of receiving the initiating command:
 setting the inventoried flag for the session specified in the initiating command to the value specified in the initiating command.

4. The method according to claim 1, wherein the tag has a random number generator or pseudo-random number generator arranged to generate a 16-bit value when the tag starts participating in an inventory round, the initiating command including, as a parameter, a reader identifier in the form of a N-bit number, N being an integer,
 the method further comprises the following steps, performed between the step of receiving the initiating command and the step of transitioning to the Open or Secured state:
 generating, with the random number generator or pseudo-random number generator, a 16-bit value referred to as binding handle, said binding handle comprising N juxtaposed bits forming the reader identifier, and
 backscattering the binding handle, said binding handle being received by the reader.

5. The method according to claim 1, wherein the tag has a random number generator or pseudo-random number generator arranged to generate a Q-bit value when the tag starts participating in an inventory round, Q being an integer, the initiating command comprising Q as a parameter, said parameter being referred to as slot-count parameter, the initiating command further comprising a first slot number as a parameter,
 the method further comprises the following step, performed between the step of receiving the initiating command and the step of evaluating whether the value in the slot counter of the tag is equal to the first slot number:
 generating, with the random number generator or pseudo-random number generator, a Q-bit value and loading it into the slot counter.

6. The method according to claim 4, wherein the binding handle includes Q juxtaposed bits different from the N juxtaposed bits, said Q juxtaposed bits forming the Q-bit value.

7. The method according to claim 5, wherein Q is in the range 0 to 5.

8. The method according to claim 6, wherein the 16-N-Q bits left in the binding handle are generated randomly by the random number generator or pseudo-random number generator.

9. The method according to claim 1, further comprising the following steps, performed between the step of transitioning to the Arbitrate state and the step of receiving a repetition command and the step of receiving a repetition command comprising a second slot number:
   receiving an intermediate repetition command comprising a slot number having an intermediate value between the first value and the second value, and
   ignoring said intermediate repetition command.

10. The method according to claim 1, wherein the tag has a memory comprising an Electronic Product Code,
   the method further comprises the following step, performed after the step of transitioning to the Open or Secured state: sending the Electronic Product Code.

* * * * *